United States Patent [19]
Monlezun et al.

[11] Patent Number: 5,960,734
[45] Date of Patent: Oct. 5, 1999

[54] INFLATABLE BOAT WITH STRENGTHENED ATTACHMENT OF ITS REAR BOARD AND METHOD FOR FITTING THE LATTER

[75] Inventors: Alain Monlezun, Donneville; Michel Franchetti, Baziege, both of France

[73] Assignee: Zodiac International, Issy les Moulineaux, France

[21] Appl. No.: 09/017,544

[22] Filed: Feb. 3, 1998

[30] Foreign Application Priority Data

Feb. 6, 1997 [FR] France .................................. 97 01347

[51] Int. Cl.⁶ ...................................................... B63B 7/00
[52] U.S. Cl. ............................................. 114/345; 441/40
[58] Field of Search ............................. 114/345; 441/40, 441/41

[56] References Cited

U.S. PATENT DOCUMENTS 4,329,751 5/1982 Cigognetti ............................... 114/345

FOREIGN PATENT DOCUMENTS 2105705 4/1972 France .
2629149 9/1989 France .
4029006 1/1992 Germany .

*Primary Examiner*—Jesus D. Sotelo
*Attorney, Agent, or Firm*—Dean W. Russell; Kilpatrick Stockton LLP

[57] ABSTRACT

Inflatable boat (1) with two inflatable tubular chambers (2) secured along the two sides of a hull, a rear board (4) being secured in watertight fashion, laterally, to the two tubular chambers (2) and, at the bottom, to the rear edge of the hull, the means of securing the rear board (4) to each tubular chamber (2) comprising a sole (5) with U-shaped section made of a semi-rigid synthetic material secured by its bottom (6) to the tubular chamber (2) in such a way that the arms (7) of the U project radially from the tubular chamber and are secured to the lateral edge of the board (4) fitted between them, each lateral edge of the board (4) has two grooves (8) cut in it, one on each of its two faces, these grooves running parallel to this lateral edge and being filled with a synthetic material (9) secured to the walls at the groove. The two arms (7) of the sole (5) are secured respectively to the material (9) with which the grooves (8) are filled.

9 Claims, 3 Drawing Sheets

INFLATABLE BOAT WITH STRENGTHENED ATTACHMENT OF ITS REAR BOARD AND METHOD FOR FITTING THE LATTER

The present invention relates to improvements made to inflatable boats comprising at least two inflatable tubular chambers bordering the two sides of a hull to which they are secured, a rear board closing the rear end of the boat and being secured in watertight fashion, laterally, to the two inflatable tubular chambers and, at the bottom, to the rear edge of the hull, in which boat the means of securing the rear board to each inflatable tubular chamber comprise a sole with U-shaped section consisting of a semi-rigid synthetic material and secured by its bottom to the inflatable tubular chamber in such a way that the arms of the U project out approximately radially from the inflatable tubular chamber and are secured to the lateral edge of the rear board fitted between them.

More specifically, the invention relates to improvements made to the securing of the rear board to the lateral tubular chambers.

Known practice at the present time is for the rear board to be secured to each inflatable tubular chamber using a sole like the aforementioned one, by bonding and/or by bolting.

However, this method of assembly is not really satisfactory.

Because of the difference in materials of which the rear board (generally made of wood—for example marine-grade plywood) and the sole (generally made of synthetic material—for example polyvinylchloride) are made, the bonding is not as good as would be wished.

Furthermore, bolting, because of the loadings induced in the sole (the connection needs to transmit the propulsive loading from the outboard motor to the boat, via the rear board and the connecting sole) may, in time, cause tearing of the sole, making it necessary for this to be replaced.

Finally, the phase of assembly work to be carried out in situ on the boat as it is being constructed is lengthy and relatively expensive.

The object of the invention is essentially to propose a structure and a method of assembly which are improved, which lead to a mechanically stronger connection and one which is easier and less expensive to manufacture.

To these ends, an inflatable board like the one mentioned in the preamble and designed in accordance with the invention, is essentially characterized:

in that each lateral edge of the rear board has at least two grooves cut in it, one on each of its two main faces, these grooves running approximately parallel to this lateral edge of the said board and being filled with a synthetic material secured to the walls at the groove, and in that the two arms of the sole are secured respectively to the material with which the said grooves of the rear board are filled.

Thanks to this design, it is possible to select materials which are compatible for bonding or welding from which to make the sole and the material that fills the grooves in the rear board. Advantageously, this may be the same material, for example polyvinylchloride, possibly reinforced with fibers or fibrils, such as glass fibers. Securing using thermal welding, with the contacting surfaces of synthetic materials melting together, leads to an assembly which is mechanically very strong and watertight.

Furthermore, the rear board can be prepared on a separate workstation, and the only remaining operation to be carried out when fitting it to the boat is the welding, which can be done quickly.

In order to increase the mechanical strength transversely to the rear board, provision may be made for each groove cut in the rear board to have a trapezoidal dovetail-shaped section so that the filling material becomes more difficult to pull out of the groove.

Another solution that allows the connection to be reinforced mechanically in a direction transversal to the rear board may consist in the two grooves being arranged approximately opposite one another and in the through-holes being made in the rear board between the two grooves, these holes being distributed, preferably uniformly, along the length of the grooves, the said holes too also being filled with synthetic material.

Of course, it is entirely possible for the aforementioned two provisions to be combined in order to obtain maximum mechanical strength.

In practical terms, it is possible to provide a first strip of semi-rigid synthetic material, which has projecting pegs in register with the holes in the board, the said strip being forced into one groove of the rear board with the pegs engaged in the aforementioned respective holes, and projecting into the other groove opposite and a second strip of semi-rigid synthetic material which has housings in register with the aforementioned holes in the board, the said second strip being forced into the other groove in the board with the said housings receiving the projecting ends of the respective pegs; in this case, the aforementioned housings are then advantageously through-holes and the projecting ends of the pegs come flush at least with the surface of the second strip.

More specifically, when producing a structure like the one described immediately above, the invention also proposes a method comprising the following steps:

a sole of semi-rigid synthetic material with U-shaped section, the arms of which project approximately radially from the tubular chamber is secured to each said inflatable tubular chamber;

two grooves more or less opposite each other and running approximately parallel to each lateral edge of the board are made in the two main faces of the said rear board, the said grooves having a trapezoidal dovetail-shaped section;

through-holes are made through the rear board, these coming out into the respective bottoms of the two grooves opposite each other;

a first strip of semi-rigid synthetic material, with projecting pegs which fit into the said holes in register, is inserted into one of the grooves, the said first strip having a width at most equal to the width of the opening of the groove and its surface extending beyond the corresponding main face of the rear board, while the ends of the pegs protrude beyond the opposite main face of the rear board;

a second strip of semi-rigid synthetic material, with through-holes in register with the aforementioned holes and which fit over the pegs of the first strip, is inserted into the other groove, the said second strip having a width at most equal to the width of the opening of the groove and its surface extending beyond the corresponding main face of the rear board;

the edge thus prepared of the rear board is fitted into the corresponding sole;

and finally, the synthetic materials of which the sole and the strips are made are heated in order to soften them and weld the pegs of the first strip to the second strip and weld the sole to the two strips while at the same time compressing the two strips opposite each other in order to make the softened synthetic material flow to make it fill at least most of the dovetail-shaped grooves, by virtue of which the rear board and the sole are firmly assembled in a way that can properly withstand both longitudinal loadings and transverse loadings.

The invention will be better understood from reading the detailed description which follows of certain embodiments which are given merely by way of non-limiting examples. In this description, reference is made to the appended drawings in which.

Figure 5A:
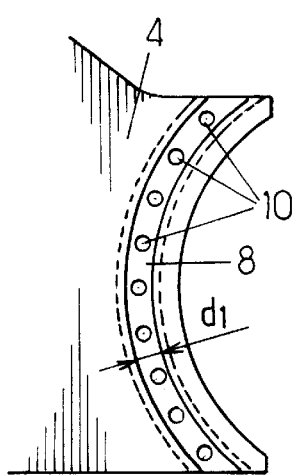
FIGS. 5A, 5B, 5C illustrate, seen from the side, constituent elements of a particularly preferred embodiment of an assembly in accordance with the invention, for employing a method of manufacture in accordance with the invention.
Figure 5B:
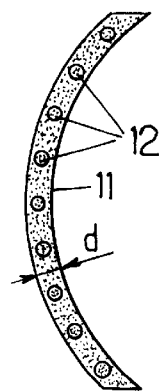
Figure 5C:
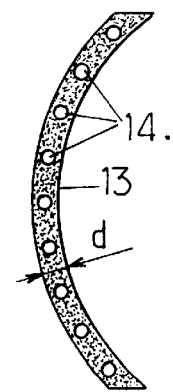
Figure 6A:
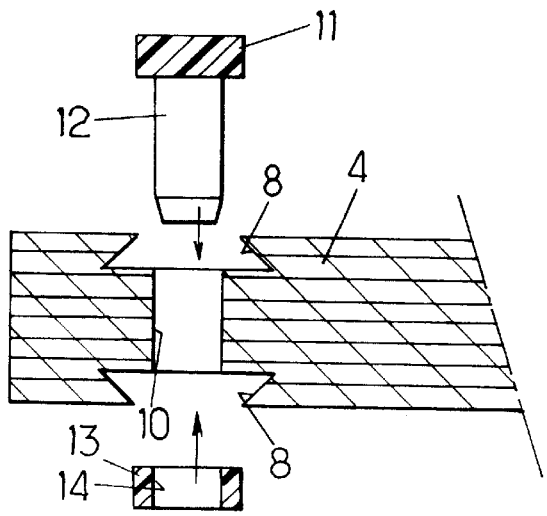
Figure 6B:
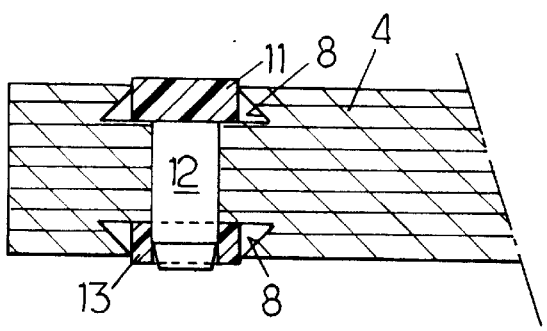
Figure 6C:
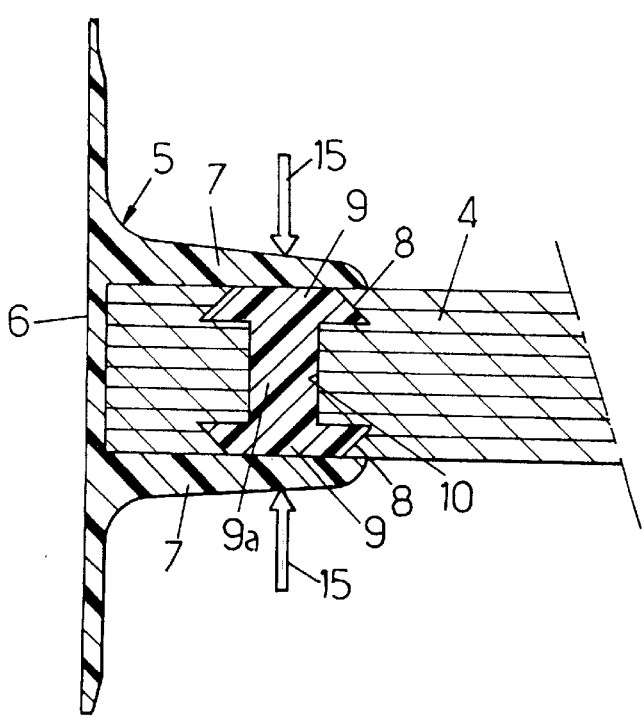

and FIGS. 6A, 6B, 6C illustrate diagrammatically, in section, three stages in a method of manufacture in accordance with the invention using the elements of FIGS. 5A, 5B, 5C, FIG. 6C illustrating a particularly preferred embodiment of an assembly in accordance with the invention.

Figure 1:
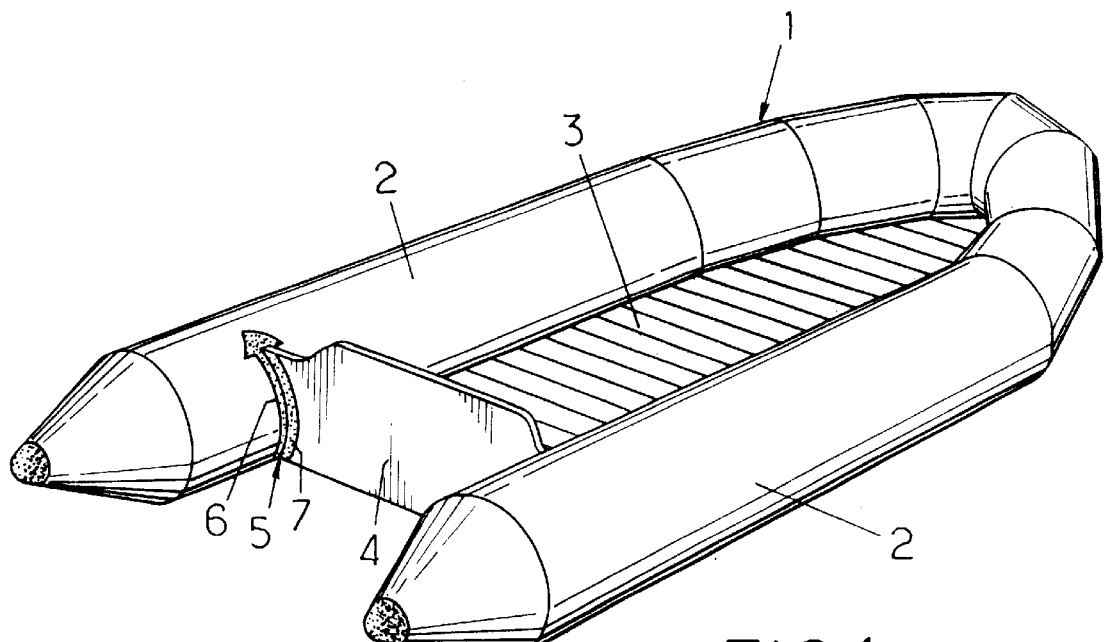
FIG. 1 is a view in perspective, from behind, of an inflatable boat equipped with a rear board.

Referring first of all to FIG. 1, this depicts diagrammatically, and in perspective, an inflatable boat 1 which comprises at least two inflatable tubular chambers 2 bordering the two sides of a hull (not visible, only the bottom 3 that covers it can be seen). In the example depicted, the two inflatable tubular chambers 2 are extended as far as the front where they meet and together form an inflatable buoyancy device in the overall shape of a U which is open at the back.

A rigid rear board 4 closes the rear end of the boat. The board 4 is secured in watertight fashion, laterally, to the two inflatable tubular chambers and, at the bottom, to the rear edge of the hull.

The means of securing the rear board 4 to each tubular chamber 2 comprise a sole 5 with U-shaped section consisting of a synthetic material and secured (for example welded or bonded) by its bottom 6 to the inflatable tubular chamber 2 in such a way that the branches or arms 7 of the U project out approximately radially from the inflatable tubular chamber 2 and are secured to the lateral edge of the rear board 4 fitted between them.

Figure 2:
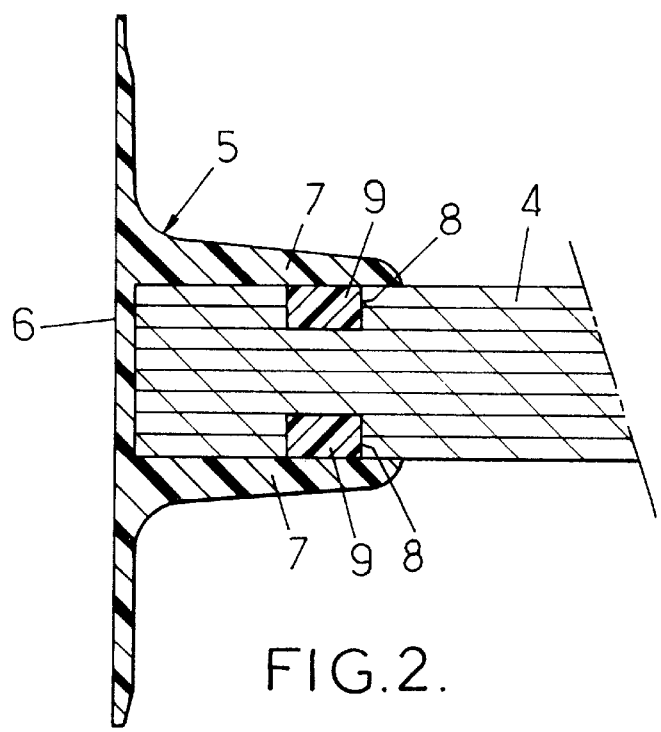
FIG. 2 is a view in section, on an enlarged scale, of an assembly in accordance with the invention.

Referring now to FIG. 2, in which the same references as in FIG. 1 have been kept to denote identical members, according to the arrangements in accordance with the invention, each lateral edge of the rear board 4 has at least two grooves 8 cut in it, one on each of its two main faces. These grooves 8 run approximately parallel to the lateral edge (which is curved to mate with the external contour of the corresponding inflatable tubular chamber 2,—not shown in FIG. 2) of the said board 4.

The grooves 8 are filled with a synthetic material 9 (for example polyvinylchloride) which sticks firmly to the walls of the grooves.

In the assembled position shown in FIG. 2, the two arms 7 of the sole 5 extend above and beyond the grooves 8 and are secured (for example by welding or bonding) to the material 9 with which the grooves 8 are filled.

Thanks to this arrangement, a bond which is robust and which in able to withstand and transmit the loadings exerted in all directions, both loadings longitudinal to the boat (propulsive loadings imparted by an outboard motor fixed to the rear board) and transverse loadings which result in shear loadings at the filler material 8/sole arms 7 joints, is produced between the rear board and the inflatable tubular chamber.

Furthermore, it will be understood that the manufacturing process is simplified because each part involved in the assembly can be prepared and preassembled: the sole 5 in fixed in advance to the inflatable tubular chamber 2; the rear board 4 is machined in advance to have the grooves 8, which are filled with material 9. If securing is obtained by bonding, the surfaces of the filler material 9 and/or the corresponding face of the arms 7 of the sole 5 are precoated with adhesive, then assembly is performed by introducing the edge of the board 4 between the parted arms of the sole 5; if securing is obtained by welding, the board is inserted into the sole, then electrodes are pressed onto the arms to cause the respective synthetic materials to soften and fuse together.

The simplification and speeding-up of the assembly lead to an appreciable reduction in the cost of manufacturing this part of the boat.

The provisions set out hereinabove can be contrived in various ways with a view to increasing the mechanical strength of the assembly and also to making the assembly process even simpler.

Figure 3:
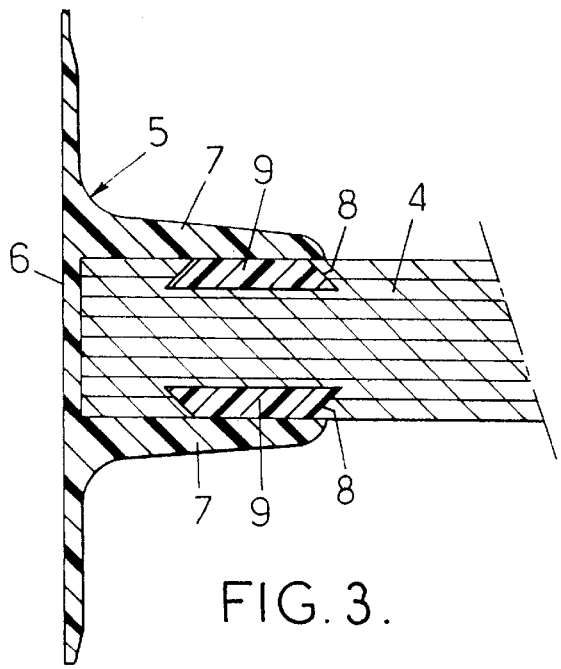
FIG. 3 is a view in section of one preferred embodiment of an assembly in accordance with FIG. 1.

As depicted in FIG. 3, it is possible to give the grooves 8 a trapezoidal or dovetail-shaped section, with an opening at the surface which is narrower than the bottom of the groove, so that the length of filler material 9 trapped in the groove 8 is held in mechanically (not counting the adherence of the material to the walls of the groove 8).

Figure 4:
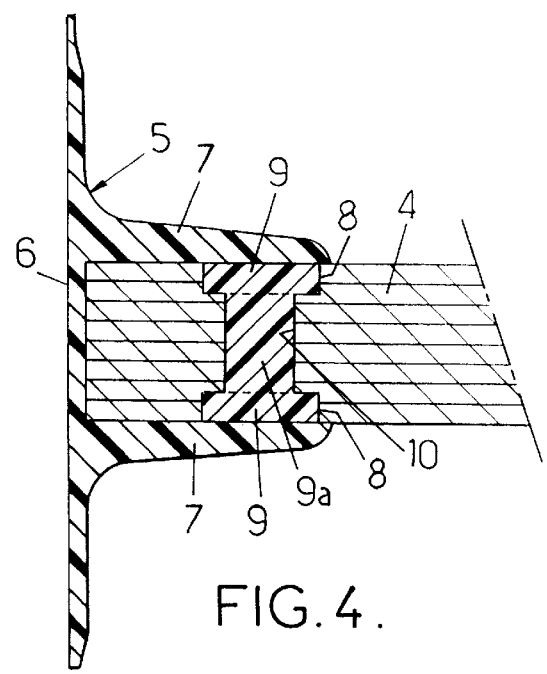
FIG. 4 is a view in section of another preferred embodiment of an assembly in accordance with FIG. 1.

As depicted in FIGS. 2 to 4, it is possible to contrive for the two grooves 8 which are on the two main faces, along one lateral edge of the rear board 4 to be arranged approximately opposite each other. It is then possible, as shown in FIG. 4, to provide through-holes 10 made in the rear board between the two grooves 8 opposite each other, these holes 10 being distributed, preferably uniformly, along the length of the grooves. The grooves 10 too are also filled with synthetic material, so that in this way bridges 9a of synthetic material are made between the lengths 9 of material filling the grooves 8.

In an especially preferred embodiment illustrated in FIG. 6C, the special arrangements of FIGS. 3 and 4 are combined so that the filler material 9 is secured to the rear board 4 in a way which has maximum strength. The mechanical strength of the block of synthetic filler material is considerably increased as it is then, so to speak, embedded in the rear board 4 and forms part of it.

A particularly simple, quick and economical implementation of the said especially preferred embodiment may be as follows.

The rear board 4 is prepared (FIG. 5A) with, along each lateral edge, two grooves 8 more or less opposite each other and with a dovetail-shaped section, and a succession of open holes 10, more or less uniformly distributed along the length of the grooves 8.

A first strip 11 (FIG. 5B) of semi-rigid synthetic material is manufactured (the strip is therefore deformable, and in particular can be curved as shown in FIG. 5B so that it conforms to the longitudinal curvature of the grooves 8). The strip 11 is given a set of pegs 12 which project from one of its faces and are integral (monobloc) with it. It will be noted that the width d of the face of the strip bearing the pegs 12 is at most equal to the width $d_1$ of the opening of the grooves 8; furthermore the spacing of the pegs 12 on the strip 11 is identical to the spacing of the holes 10 in the grooves 8.

A second strip 13 (FIG. 5C) of semi-rigid synthetic material (preferably the same material as was used for the first strip 11) is also manufactured. The strip 13 has housings 14, such as through-holes, which have the same spacing as the through-holes 10 in the grooves 8 and sized to accommodate the pegs 12 of the first strip 11. The second strip 13 too, has a width which is smaller than the width of the opening of the grooves 8 and is preferably the same width d as the first strip.

The two strips 11 and 13 may, for example, be made of PVC filled with glass fibers, preferably long fibres.

For fitting, the first strip 11, curved beforehand, is introduced into one of the grooves 8, the pegs 12 passing through the holes 10 and emerging in the other groove 8 opposite, then the second strip 13, also already curved, is inserted into the other groove 8 in such a way that its housings 14 fit over the ends of the pegs 12 (FIG. 6A).

It will be noted here that as illustrated in FIG. 6B, the strips 11 and 13 have thicknesses which slightly exceed the depth of the respective grooves 8, so that the upper faces of the strips project slightly beyond the corresponding main faces of the rear board 4. Furthermore, the housings 14 here are through-holes, and the length of the pegs 12 is such that their free end protrudes beyond the upper face of the second strip, and therefore beyond the corresponding main face of the rear board 4.

The lateral edge of the board 4 thus prepared is then inserted into the sole 5, the arms 7 thereof tightly gripping the strips 11, 13. Then electrodes (depicted diagrammatically by arrows 15 in FIG. 6C) are applied to the arms 7 and heat up the synthetic materials situated between them at the same time as they are clamped together to compress these materials. The heated and softened synthetic materials are therefore forced to melt superficially at the same time as, because there is excess material on account of the increased thickness of the strips, softened material is forced to flow towards the edges of the dovetail-shaped grooves and to fill these grooves.

It will thus be understood that the method in accordance with the invention makes the assembly process simpler, so this process becomes quicker and therefore more economical.

As goes without saying and as is already evident from the above, the invention is not in any way restricted to those of its applications and embodiments which have been more specifically envisaged; on the contrary, it encompasses all alternative forms thereof.

We claim:

1. Inflatable boat (1) comprising at least two inflatable tubular chambers (2) bordering the two sides of a hull to which they are secured, a rear board (4) closing the rear end of the boat and being secured in watertight fashion, laterally, to the two inflatable tubular chambers (2) and, at the bottom, to the rear edge of the hull, in which boat the means of securing the rear board (4) to each inflatable tubular chamber (2) comprise a sole (5) with U-shaped section consisting of a semi-rigid synthetic material secured by its bottom (6) to the inflatable tubular chamber (2) in such a way that the arms (7) of the U project out approximately radially from the inflatable tubular chamber and are secured to the lateral edge of the rear board (4) fitted between them, characterized:

in that each lateral edge of the rear board (4) has at least two grooves (8) cut in it, one on each of its two main faces, these grooves running approximately parallel to this lateral edge of the said board and being filled with a synthetic material (9) secured to the walls at the groove, and in that the two arms (7) of the sole (5) are secured respectively to the material (9) with which the said grooves (8) of the rear board (4) are filled.

2. Inflatable boat according to claim 1, characterized in that each groove (8) cut in the rear board (4) has a trapezoidal dovetail-shaped section.

3. Inflatable boat according to claim 1, characterized in that the two grooves (8) associated with one lateral edge of the rear board (4) are substantially opposite each other.

4. Inflatable boat according to claim 3, characterized in that through-holes (10) are made in the rear board (4) between the two grooves (8), these holes (10) being distributed along the length of the grooves (8), and in that the said holes (10) too are also filled with synthetic material (9a).

5. Inflatable boat according to claim 3, characterized in that through-holes (10) are made in the rear board (4) between the two grooves (8), these holes (10) being distributed along the length of the grooves (8), and in that the said holes (10) too are also filled with synthetic material (9a) and that the holes (10) are substantially uniformly spaced from one another.

6. Inflatable boat according to claim 1, characterized in that the two grooves (8) associated with one lateral edge of the rear board (4) are more or less opposite each other, that through-holes (10) are made in the rear board (4) between the two grooves (8), these holes (10) being distributed along the length of the grooves (8), and in that the said holes (10) too are also filled with synthetic material (9a), and that it comprises a first strip (11) of semi-rigid synthetic material, which has projecting pegs (12) in register with the holes (10) in the board (4), the said strip (11) being forced into one groove (8) of the rear board (4) with the pegs (12) engaged in the aforementioned respective holes (10), and projecting into the other groove (8) opposite and in that it comprises a second strip (13) of semi-rigid synthetic material which has housings (14) in register with the aforementioned holes (10) in the board (4), the said second strip (13) being forced into the other groove (8) in the board with the said housings (14) receiving the projecting ends of the respective pegs (12).

7. Inflatable boat according to claim 6, characterized in that the aforementioned housings (14) are through-holes and in that the projecting ends of the pegs (12) come flush at least with the surface of the second strip (13).

8. Inflatable boat according to claim 6, characterized in that the synthetic material of which the two strips (11, 13) are made is polyvinylchloride reinforced with glass fibres.

9. Method for securing a rear board (4) of an inflatable boat (1) to an inflatable tubular chamber (2) laterally bordering a rigid hull to which it is secured, characterized in that this method comprises the following steps:

a sole (5) of semi-rigid synthetic material with U-shaped section, the arms (7) of which project out approximately radially from the tubular chamber (2) is secured to each said inflatable tubular chamber (2);

two grooves (8) substantially opposite each other and running approximately parallel to each lateral edge of the board (4) are made in the two main faces of the said rear board (4), the said grooves (8) having a trapezoidal dovetail-shaped section;

through-holes (10) are made through the rear board (4), these coming out into the respective bottoms of the two grooves (8) opposite each other;

a first strip (11) of semi-rigid synthetic material, with projecting pegs (12) which fit into the said holes (10) in register, is inserted into one of the grooves, the said first strip (11) having a width at most equal to the width of the opening of the groove (8) and its surface extending beyond the corresponding main face of the rear board (4), while the ends of the pegs (12) protrude beyond the opposite main face of the rear board;

a second strip (13) of semi-rigid synthetic material, with through-holes (14) in register with the aforementioned holes (10) and which fit over the pegs (12) of the first strip (11), is inserted into the other groove, the said second strip (13) having a width at most equal to the width of the opening of the groove (8) and its surface extending beyond the corresponding main face of the rear board;

the edge thus prepared of the rear board (4) is fitted into the corresponding sole (5);

and finally, the synthetic materials of which the sole (5) and the strips (11, 13) are made are heated in order to soften them and weld the pegs (12) of the first strip to the second strip and weld the sole (5) to the two strips (11, 13) while at the same time compressing (15) the two strips (11, 13) opposite each other in order to make the softened synthetic material flow to make it fill at least most of the dovetail-shaped grooves (8), by virtue of which the rear board (4) and the sole (5) are firmly assembled in a way that can properly withstand both longitudinal loadings and transverse loadings.

* * * * *